United States Patent [19]

Bodycomb, Jr. et al.

[11] 4,243,011
[45] Jan. 6, 1981

[54] DUST SHROUD FOR PIPE-CUTTING PORTABLE CIRCULAR SAW

[75] Inventors: Frederick M. Bodycomb, Jr., Englewood; Glenn R. Bauman, Littleton, both of Colo.

[73] Assignee: Johns-Manville Corporation, Denver, Colo.

[21] Appl. No.: 51,604

[22] Filed: Jun. 25, 1979

[51] Int. Cl.³ .............................................. B28D 1/04
[52] U.S. Cl. .................... 125/13 R; 51/273; 51/283 R; 51/290
[58] Field of Search ............. 125/13 R, 13 SS, 14; 51/273, 283 R, 290

[56] References Cited

U.S. PATENT DOCUMENTS

| 2,855,733 | 10/1958 | Allison | 125/13 SS |
| 3,119,602 | 1/1964 | Johnson | 125/13 R |
| 3,187,738 | 6/1965 | Christopher | 125/13 R |
| 3,585,980 | 6/1971 | Mellor | 51/273 |
| 4,055,160 | 10/1977 | Wilson | 125/13 SS |

Primary Examiner—Harold D. Whitehead
Attorney, Agent, or Firm—Robert M. Krone; Joseph J. Kelly; James W. McClain

[57] ABSTRACT

A dust shroud is disclosed for a pipe-cutting portable circular saw. The shroud comprises upper and lower blade housings which are nested and guided so that the lower housing can be moved into and out of the upper housing. The lower periphery of the lower housing generally conforms to the shape of the pipe to be cut. A device which cooperates with the saw and which fits into the pipe to collect dust from within the pipe is also described.

5 Claims, 5 Drawing Figures

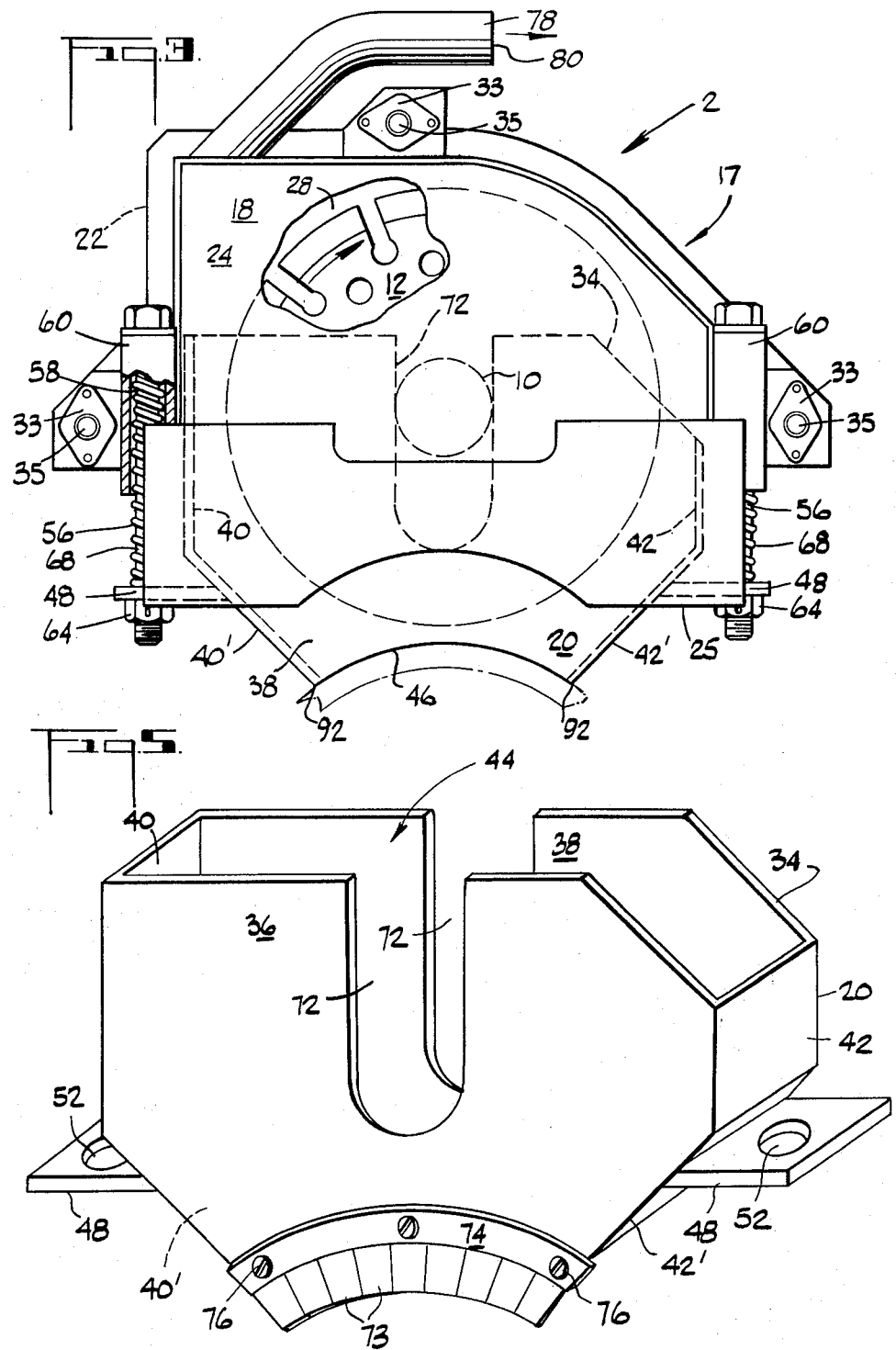

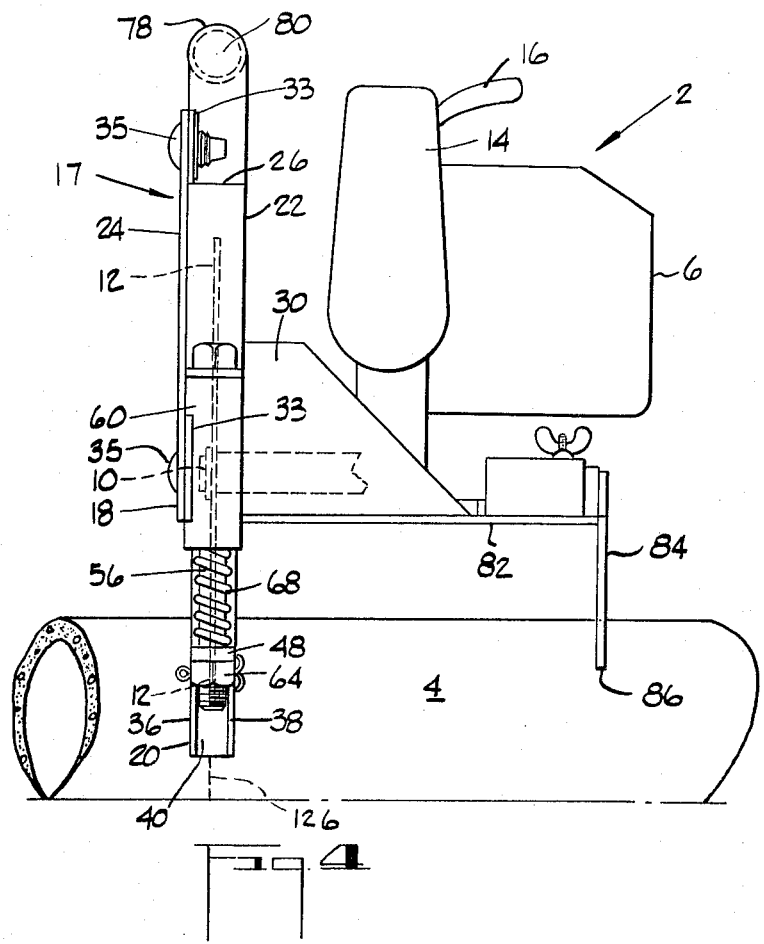

DUST SHROUD FOR PIPE-CUTTING PORTABLE CIRCULAR SAW

TECHNICAL FIELD

The invention herein relates to dust shrouds for portable circular saws. More particularly, it relates to dust shrouds for pipe-cutting portable circular saws.

BACKGROUND OF PRIOR ART

In the sawing of pipes and similar hollow generally cylindrical objects made of materials such as asbestos-cement or concrete, considerable amounts of sawdust are generated both outside and inside the pipe. The dust generated outside the pipe surface represents a particularly serious problem, for such airborne dust can be respired by the saw operator and others in the immediate vicinity of the cutting operation. The airborne dust can also settle on nearby equipment, requiring frequent cleaning of the equipment and posing the problem of undue wear and mechanical failure of the equipment if the dust works into equipment components such as bearings, gear trains and the like. The dust generated inside the hollow pipe or similar object is a lesser problem because it is to some extent contained within the walls of the pipe. It is still of concern, however, because when the cut pieces of pipe are separated the dust inside frequently becomes airborne and is thus detrimental for the reasons just described. Similarly, during the cutting operation some of the dust generated inside the pipe can sift out through the saw kerf and become airborne. Containment of dust within the pipe body is also quite limited when the cutting operation takes place near the open end of the length of pipe.

The problems of dust collection are particularly acute when the saw used to cut the pipe or similar object is a portable circular saw. A fixed saw such as a radial arm saw or a table saw can be completely enclosed by dust collection means such as a housing surrounding the entire device. The portable circular saw, however, is normally used on worksites at locations where construction or use of a dust collection housing enclosing the entire operation is not feasible. Consequently, the problems associated with collecting dust generated by use of a portable circular saw to cut pipe are significantly more severe than the problems associated with dust collection from fixed types of saws.

It would therefore be desirable to have dust collection means capable of being used with portable circular saws and adapted to collect substantially all the dust generated during cutting of pipe or similar hollow generally cylindrical objects with such saws. It would be particularly desirable to have collection means which will collect all the dust generated outside the surface of the pipe, and it would be of added benefit to have apparatus capable of collecting not only the dust generated outside the pipe but also that generated within the hollow interior of the pipe.

BRIEF SUMMARY OF THE INVENTION

The invention herein is a dust shroud for a portable circular saw adapted for cutting a hollow generally cylindrical object, the saw comprising a motor, a shaft rotated by the motor, a circular blade mounted on one end of the shaft so as to rotate therewith, and a motor housing surrounding the motor with the shaft projecting out of the motor housing and the blade being mounted on the shaft outside the motor housing. The dust shroud of this invention comprises (a) an upper blade housing attached to the saw and comprising walls forming a first enclosed chamber open at the bottom, the chamber being of sufficient size to surround at least the major portion of the blade and to permit free rotation of the blade within the upper blade housing, the upper blade housing also having an exhaust duct attached thereto with the interior of the exhaust duct communicating with the chamber; (b) a lower blade housing comprising walls forming a second enclosed chamber open at the top and bottom, the chamber being of sufficient size to surround at least the lower portion of the blade and to permit free rotation of the blade within the lower blade housing, the lower blade housing fitting within the upper blade housing and capable of slidable movement therein, and the periphery of the open bottom of the lower blade housing having a shape generally conforming to the surface curvature of the object; and (c) guide means mounted on the upper blade housing and attached to the lower blade housing, said means being adapted to bias the lower blade housing slidably outward from within the upper blade housing and to guide the lower blade housing slidably into the upper blade housing when the lower blade housing is urged against the object.

The invention also comprises apparatus for use in cutting a hollow generally cylindrical object, the apparatus comprising: (a) a portable circular saw comprising a motor, a shaft rotated by the motor, a circular blade mounted on one end of the shaft so as to rotate therewith, a motor housing surrounding the motor with the shaft projecting out of the motor housing and the blade being mounted on the shaft outside the motor housing, and a dust shroud as defined above; and (b) interior dust collection means comprising a hollow axially extending conduit having one closed end, a first baffle mounted at the closed end and having a configuration conforming generally to the interior configuration of the object, a second baffle mounted on the conduit and spaced apart from the first baffle, the second baffle also having a shape conforming generally to the interior shape of the object, the baffles thereby in cooperation with the interior surfaces of the walls of the object forming an enclosed chamber within the object, and the conduit having an opening in the wall thereof between the first and the second baffles, the opening affording direct communication between the chamber formed by the baffles and the object's walls and the interior of the conduit.

The invention also comprises a method of cutting a hollow generally cylindrical object while simultaneously collecting dust generated by the cutting which comprises aligning the interior dust collection means of the aforesaid apparatus within the object and the shrouded saw outside the object such that the saw blade cuts through the walls of the object at a point between the first and second baffles, while simultaneously applying a source of vacuum to the exhaust duct of the shrouded saw and the interior of the conduit such that dust generated during cutting of the object is rapidly and essentially completely collected.

BRIEF DESCRIPTION OF THE DRAWINGS

FIG. 3 is a side elevation view showing another embodiment of a dust shroud of the present invention in its extended blade covering position.

FIG. 4 is a rear view of a portable circular saw having mounted therein an embodiment of a dust shroud of the present invention.

FIG. 5 is a perspective view of an embodiment of the lower blade housing of a dust shroud of the present invention.

DETAILED DESCRIPTION OF THE INVENTION

The present invention relates to means for collecting the sawdust generated when a portable circular saw 2 is used to cut a hollow, generally cylindrical, object such as a pipe 4. For brevity herein the workpiece or object to be cut will be referred to as a "pipe" although it will be evident to those skilled in the art that the type of workpiece is not limited to pipes. Similarly, although a pipe is normally cylindrical in shape, it will be understood that the hollow object to be cut need not be substantially circular in cross-section, but may be oval, elliptical or of a similar substantially rounded configuration. Means for conforming the dust shroud of the present invention to rounded shapes other than circular will be described below.

Figure 1:
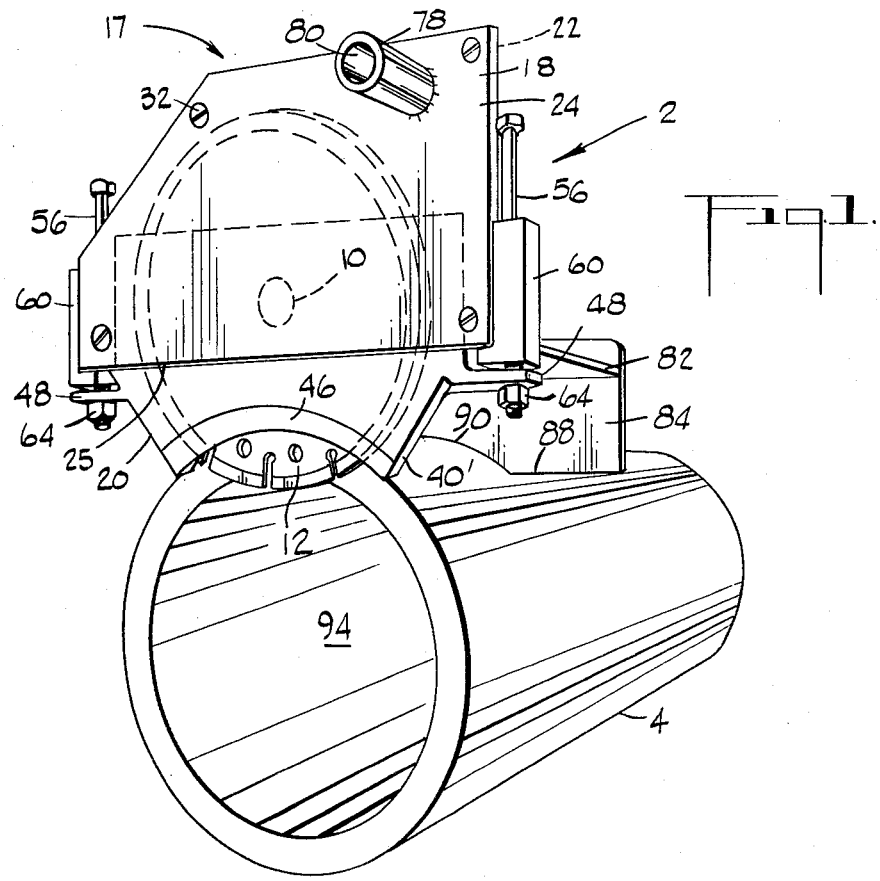
FIG. 1 is a perspective view showing a saw fitted with one embodiment of a dust shroud of the present invention and illustrating the manner in which it cuts a hollow generally cylindrical object, in this case exemplified by a pipe.

The saw 2 is generally a conventional portable circular saw powered either electrically or pneumatically. The saw is composed of a motor housing 6 inside of which is a motor (not shown) which rotates a shaft 10 on which is mounted a circular saw blade 12. The saw blade 12 is normally removably mounted on the shaft 10 and secured for use by conventional clamping means such as nuts threaded onto the end of the shaft. Saw blades are normally interchangeable with other blades of the same or smaller diameters and a wide variety of such blades are available commercially. Since most pipes which are cut with portable circular saws are made of asbestos-cement or concrete, it is common to use masonry or diamond blades in such service; the blade shown in FIGS. 1 and 3 is a common design of a diamond blade.

Attached to the outside of motor housing 6 is handle 14 which is used by the operator to control and guide the saw. In the embodiment shown the saw is powered electrically and for this purpose is fitted with cord 16. If the motor were pneumatically powered cord 16 would be replaced by an appropriate air line. Also conventionally incorporated in saw 2 (usually in handle 14) is an off/on switch (not shown) to permit the user to stop and start the motor.

Thus far the saw structure is conventional, with the exception that the retractable saw blade guard found on standard portable circular saws is not present.

The dust shroud 17 of this invention is comprised of an upper blade housing 18 and a lower blade housing 20. Upper blade housing 18 is formed of sidewalls 22 and 24 joined by a lateral member 26. The lateral member 26 extends around three sides of the sidewalls 22 and 24 such that the three members 22, 24 and 26 form a housing having a hollow chamber 28 therewithin which is open at the bottom 25. Within this chamber 28 the upper portion of blade 12 rotates. Normally this upper blade housing 18 is sufficiently large so as to enclose the major portion of blade 12 including the portion immediately surrounding shaft 10. The upper blade housing 18 can be of any desired shape as long as it forms an interior chamber 28 sufficiently large to allow free rotation of blade 12, to provide an adequate air path for the dust generated to be exhausted from the chamber and to allow adequate retraction of lower blade housing 20. The upper housing 18 is normally attached to saw 2 by means of stiffener plates 30 welded or bolted to side 22. The stiffener plates 30 are joined to base plate 82 usually by welding, or a piece combining stiffener plates 30 and base plate 82 could be cast as a unitary member. It may also be attached directly to the motor housing 6. In the embodiment shown in FIG. 1, screws 32 hold members 22, 24 and 26 together to form the upper housing, while in the embodiment shown in FIGS. 3 and 4 plates 33 and bolts 35 are used to secure the members together. The upper blade housing may have a shape which is roughly trapezoidal, generally semicircular or any other similar shape which will allow for free blade rotation and adequate dust exhaust. In order to get the desired slidable fit of the lower blade housing in the upper blade housing, however, it will be necessary that both the upper portion of the lower blade housing and the lower portion of the upper blade housing form vertical surfaces. Thus, a generally semicircular curve or similar shape for the upper blade housing must be configured so as to clear the lower blade housing. The upper portion of lower blade housing 20 may also be configured as with a bevel 34 to provide adequate clearance within upper housing 18 during retraction of the lower blade housing into the upper blade housing. Such design considerations will of course be evident to those skilled in the art.

The lower blade housing 20 is formed from four vertical walls 36, 38, 40 and 42 which together form enclosed chamber 44 in which the lower portion of blade 12 is free to rotate. The dimensions of lower chamber 20 are such that it fits slidably within upper chamber 18 as illustrated in FIGS. 1, 3 and 4. Chamber 44 is open at both the top and bottom. In a preferred embodiment the lower periphery 46 of lower chamber 20 is curved to conform to the curvature of the pipe 4 which is to be cut. In order to provide this curvature the lower portions of walls 40 and 42 may be angled inwardly as shown at 40' and 42' to provide closure of the bottom of chamber 44 except where it is in contact with the pipe 4.

Projecting from walls 40 and 42 are lugs 48 which are pierced by holes 52. These lugs permit attaching lower chamber 20 to upper chamber 18 by means of elongated bolts 56 which project through hollow sleeves 60 which are mounted on upper chamber 18. The nuts 56 pass through sleeves 60 and holes 52 in lugs 48 and are secured by nuts 64 below lugs 48. Coiled about bolts 56 and seated within sleeves 60 are compression springs 68 which bear on the upper surfaces of lugs 48. These springs serve to bias lower chamber 20 outwardly of its sliding nested relationship with upper chamber 18 to an extent limited by the maximum expansion of the spring or by the working length of bolts 56, whichever is less. The expansive force of the springs 68 will serve to maintain the lower chamber 20 in its outwardly extended position and will resist its retraction when the saw is being forced against the pipe or other workpiece. The degree of resistance to be provided by the springs 68 at the fully extended position can be readily selected by the user by a proper choice of spring length and bolt length. Normally the springs 68 will be selected such that the lower blade housing 20 can be readily extended to cover the entire lower portion of the blade 12 for safety reasons when the saw is not in use, but will permit ready retraction of the lower blade housing 20 when the saw is urged against the workpiece with only moderate force.

Walls 36 and 38 of the lower blade chamber 20 contain notches 72. These notches are intended to permit shaft 10 of the saw to project through the lower blade housing 20 into chamber 44 and permit the lower blade housing 20 to be extended and retracted without interfering with the rotation of shaft 10.

When cutting pipe in the field, it is very common to have a large number of cuts to be made on pipe of identical diameters, for a pipeline normally is formed of a plurality of lengths of equal diameter pipe. Consequently, the saw shroud of the present invention can be formed with the lower edge 46 of lower chamber 20 formed in a permanent desired radius of curvature which matches the radius of curvature of the outer surface of the pipe 4 to be cut. The same unit can thus be used repeatedly without the user being concerned about having the unit fail to conform to the surface of the various lengths of pipe to be cut.

Where there are different sizes of pipe to be cut during two series of cuts, the shroud of the present invention can be adapted for such use in two different ways. Where it is expected that the second series of cuts will be made in pipes all having the same diameter, such as where the saw is being moved for use from a main pipeline to a branch pipeline with a uniform but smaller pipe diameter, a new lower chamber 20 having the desired different radius of curvature of periphery 46 can be readily interchanged with the previous lower chamber 20 simply by removing the nuts 64, removing the first lower chamber 20 and replacing it with the second lower chamber 20, and reattaching nuts 64. Normally the lower chambers 20 must be interchanged in this manner when the radii of curvature of the two different pipes are substantially different. On the other hand, there are situations in which the radii of curvature of pipes differ only slightly and where it is anticipated that the saw must frequently be moved from a pipe of one diameter to a pipe of slightly different diameter. This can be readily accomplished by using a lower chamber 20 which has attached to the lower edge thereof flexible strips 73 which are clamped in place on the outside of the walls of lower blade housing 20 by strips such as 74 held in place by screws 76 (FIG. 5). Such strips 73 would normally be mounted on the outside of walls 36 and 38 and preferably also on the bottom edges of walls 40 and 42. The strips would normally be made of a flexible material such as rubber or a similar elastomer or they could be made of thin flexible strips of metal. The degree of difference in diameter or radius of curvature of the workpieces which will dictate whether or not the lower blade housings 20 must be interchanged or the differences can be accommodated by flexible strips 73 can readily be determined by the user. If the difference in radius of curvature or diameter is too great flexible strips 73 will not contain the dust generated and/or they will interfere with the operation of blade 12 or the retraction of lower housing 20. In either case the remedy will be to change the lower blade housing 20 for one with a radius of curvature which more closely conforms to the particular pipe diameter of the pipe being cut.

Mounted on the side of upper chamber 18 is exhaust duct 78 which has a hollow interior 80 which communicates directly with the interior chamber 28 of upper chamber 18 and thus indirectly with the inner chamber 44 of lower blade housing 20. The exhaust duct 78 can be mounted on wall 22, 24 or 26 at any convenient position where it will not interfere with the operation of blade 12 and the extension/retraction motion of lower chamber 20. FIGS. 1, 3 and 4 illustrate typical placements of exhaust duct 78. It must of course be mounted in a position such that when the lower blade housing 20 is retracted as it is during operation of the saw, the opening of interior 80 of the exhaust duct into the chamber 28 is not blocked by lower blade housing 20. Exhaust duct 78 is adapted to be attached to a flexible hose (not shown) by conventional means such as hose clamps. The hose is in turn connected to a source of vacuum and a dust collection chamber such that dust generated by the cutting action of saw blade 12 which is carried into the chambers 28 and 44 will be exhausted from those chambers by exhaust duct 78 and the attached hose and conveyed to the collection chamber for collection and ultimate disposal.

Mounted on the bottom of saw 2 is base plate 82 which is attached at its end opposite the blade 12 and shroud 17 to vertical leg 84. Leg 84 may have a flat bottom surface 86 or the surface may be partially flat as indicated at 88 and partially curved as indicated at 90 to conform to the radius of curvature of the pipe 4 being cut. Normally the bottom 86 (and where present, the curved portion 90) will be aligned with the retracted position of lower blade housing 20 such that the saw in service will rest directly against the pipe surface and be supported by the lower edge 46 of the blade housing 20 and the bottom 86 (or 90) of the leg 84. When the saw is not in service and lower blade housing 20 is in its extended position the saw can be rested in a substantially upright position by standing on the lower corners 92 of lower blade housing 20 and the lower edge 86 (or 88) of leg 84.

Optimum dust collection is obtained when the amount of area of the shroud open to the air is minimized, consistent with not producing under drag of the saw as it progresses around the perimeter of the pipe. Thus normally the saw motor will use a separate source of air for cooling than the air used in the shroud for dust collection. It is preferred that all unnecessary openings to the interior of chambers 28 and 44 be eliminated, consistent with creation of a tolerable amount of drag. The opening for the motor shaft 10 into chamber 28 should be sealed with a conventional rotary shaft seal.

Figure 2:
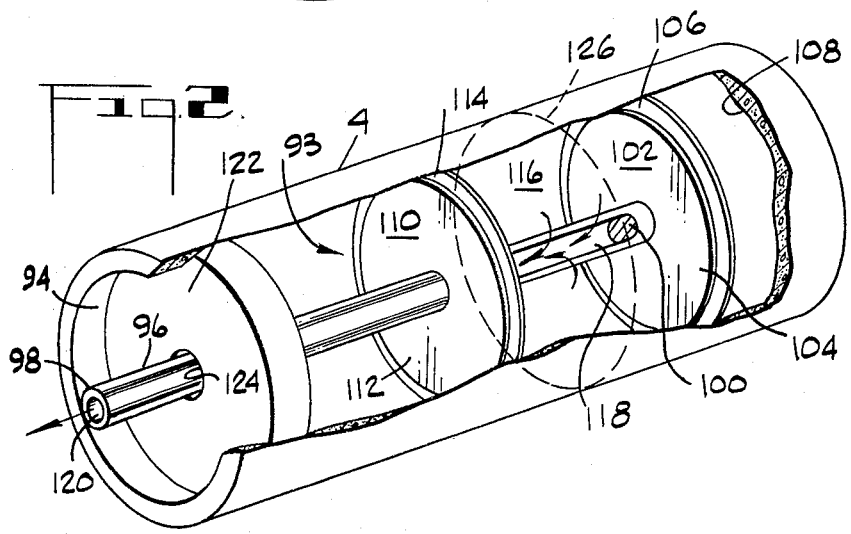
FIG. 2 is a perspective view partially cut away showing the interior dust collection means of the present invention.

Another component of the present invention is interior collection device 93 for collecting dust generated within the interior 94 of pipe 4, as illustrated in FIG. 2. The device 93 comprises an axial extending hollow conduit 96 which is open at one end 98 and closed at the other end 100. Mounted adjacent to the closed end 100 of conduit 96 is first baffle 102. Commonly this is formed of a rigid plate 104 surrounded by a peripheral annular gasket 106. The gasket 106 is sized so as to be substantially equal to or slightly greater than the interior diameter 108 of the pipe 4. Spaced apart from first baffle 102 and mounted on conduit 76 is second baffle 110 which is similar in construction to first baffle 102 in that it comprises a rigid plate 112 and a peripheral annular gasket 114 which conforms to the interior diameter 108 of pipe 4 in the same manner as gasket 106. The two baffles 102 and 110 being spaced apart along the axis of conduit 96 form between them (in cooperation with the inner surface of the wall of pipe 4) hollow chamber 116.

In the segment of conduit 96 which lies between baffles 102 and 110 and within chamber 116 there is formed an aperture 118 in the wall of conduit 96 such that there is direct communication between the interior 120 of conduit 96 and chamber 116. Conduit 96 extends axially along the pipe 4 and is joined at its open end 98 to a source of vacuum, normally through a hose (not shown) attached to conduit 96 by conventional means such as hose clamps. Where conduit 96 is of significant length, it is helpful to insert in pipe 94 an annular collar 122 with an opening 124 therin through which conduit 94 can project. Normally hole 124 is slightly greater in diameter than conduit 96 such that conduit 96 can be readily extended through hole 124 while yet allowing hole 124 to provide support and alignment for conduit 96.

In service the apparatus shown in FIG. 2 is placed in pipe 4 such that chamber 116 lies directly beneath the line 126 at which the saw blade 12 is to cut through the pipe 4. Thus, dust generated within the interior of pipe 4 by the cutting action of blade 12 is confined by baffles 102 and 110 to chamber 116 from which it can be withdrawn through aperture 18 and the interior 120 of conduit 96 to a dust collection chamber associated with the source of vacuum.

STATEMENT OF INDUSTRIAL APPLICATION

The invention herein is useful with portable circular saws when the saws are intended to be used to cut pipe and similar hollow object. Such cutting operations commonly occur in pipe fabrication plants and in field jobsites where pipelines are being laid and/or repaired.

We claim:

1. A dust shroud for a portable circular saw adapted for cutting a hollow generally cylindrical object, the saw comprising a motor, a shaft rotated by said motor, a circular blade mounted on one end of said shaft so as to rotate therewith, and a motor housing surrounding said motor with the shaft projecting out of the motor housing and the blade being mounted on the shaft outside the motor housing; said dust shroud comprising
   (a) an upper blade housing attached to said saw and comprising walls forming a first enclosed chamber open at the bottom, said first chamber being of sufficient size to surround at least the major portion of said blade and to permit free rotation of said blade within said upper blade housing, said upper blade housing also having an exhaust duct attached thereto with the interior of said exhaust duct communicating with said first chamber;
   (b) a lower blade housing comprising walls forming a second enclosed chamber open at the top and bottom, said second chamber being of sufficient size to surround at least the lower portion of said blade and to permit free rotation of said blade within said lower blade housing, said lower blade housing fitting within said upper blade housing and capable of slidable movement therein, and the periphery of the open bottom of said lower blade housing having a shape generally conforming to the surface curvature of said object; and
   (c) guide means mounted on said upper blade housing and attached to said lower blade housing, said guide means being adapted to bias said lower blade housing slidably outward from within said upper blade housing and to guide said lower blade housing slidably into said upper blade housing when said lower blade housing is urged against said object.

2. A dust shroud as in claim 1 wherein said guide means comprises:
   (a) a plurality of compression springs seated within sleeves mounted on said upper blade housing and engaging lugs projecting from said lower blade housing; and
   (b) a plurality of bolts cooperating with said springs to direct and limit the extension and retraction of said lower blade housing.

3. A dust shroud as in claim 2 wherein said lower periphery of said lower blade housing has attached thereto flexible sealing means to insure dust collection when said lower periphery does not conform exactly in shape to the curvature of said object.

4. Apparatus for use in cutting a hollow generally cylindrical object, the apparatus comprising:
   (a) a portable circular saw comprising a motor, a shaft rotated by said motor, a circular blade mounted on one end of said shaft so as to rotate therewith, a motor housing surrounding said motor with said shaft projecting out of said motor housing and said blade being mounted on the shaft outside said motor housing, and a dust shroud as in claims 1, 2 or 3 attached to said saw; and
   (b) interior dust collection means comprising a hollow axially extending conduit having one closed end, a first baffle mounted at said closed end and having a configuration conforming generally to the interior configuration of said object, a second baffle mounted on said conduit and spaced apart from said first baffle, said second baffle also having a shape conforming generally to said interior shape of said object, said baffles thereby in cooperation with the interior surfaces of the walls of said object forming an enclosed chamber within said object, and said conduit having an opening in the wall thereof between said first and said second baffles, said opening affording direct communication between said chamber formed by said baffles and said walls of said object and said interior of the conduit.

5. A method of cutting a hollow generally cylindrical object while simultaneously collecting dust generated by said cutting which comprises aligning said interior dust collection means of the apparatus of claim 4 within said object and said shrouded saw outside said object such that said saw blade cuts through said walls of said object at a point between said first and second baffles, while simultaneously applying a source of vacuum to said exhaust duct of said shrouded saw and said interior of said conduit such that dust generated during cutting of said object is rapidly and essentially completely collected.

* * * * *

Dedication 4,243,011.—*Frederick M. Bodycomb, Jr.,* Englewood and *Glenn R. Bauman,* Littleton, Colo. DUST SHROUD FOR PIPE-CUTTING PORTABLE CIRCULAR SAW. Patent dated Jan. 6, 1981. Dedication filed July 19, 1982, by the assignee, *Johns-Manville Corp.*

Hereby dedicates to the Public the entire remaining term of said patent.
[*Official Gazette November 16, 1982.*]